(12) United States Patent
Lewis

(10) Patent No.: US 11,178,808 B1
(45) Date of Patent: Nov. 23, 2021

(54) SURFACE WATER CHEMICAL INJECTION SYSTEM AND METHOD OF USE

(71) Applicant: Trent Lewis, Gunter, TX (US)

(72) Inventor: Trent Lewis, Gunter, TX (US)

( * ) Notice: Subject to any disclaimer, the term of this patent is extended or adjusted under 35 U.S.C. 154(b) by 0 days.

(21) Appl. No.: 15/952,000

(22) Filed: Apr. 12, 2018

Related U.S. Application Data

(60) Provisional application No. 62/484,492, filed on Apr. 12, 2017.

(51) Int. Cl.

| | |
|---|---|
| *A01C 23/00* | (2006.01) |
| *A01C 23/04* | (2006.01) |
| *A01K 63/04* | (2006.01) |
| *A01M 21/04* | (2006.01) |
| *A01M 7/00* | (2006.01) |
| *B01F 3/04* | (2006.01) |
| *C02F 1/00* | (2006.01) |
| *C02F 1/68* | (2006.01) |
| *C02F 1/74* | (2006.01) |
| *C02F 7/00* | (2006.01) |
| *G05B 15/02* | (2006.01) |
| *G05B 19/04* | (2006.01) |
| *C02F 103/00* | (2006.01) |

(52) U.S. Cl.
CPC ......... *A01C 23/007* (2013.01); *A01M 7/0085* (2013.01); *A01M 7/0092* (2013.01); *A01M 21/043* (2013.01); *B01F 3/04836* (2013.01); *C02F 1/008* (2013.01); *C02F 1/686* (2013.01); *C02F 1/74* (2013.01); *C02F 7/00* (2013.01); *G05B 15/02* (2013.01); *G05B 19/041* (2013.01); *A01C 23/042* (2013.01); *A01K 63/047* (2013.01); *B01F 2003/04872* (2013.01); *C02F 2103/007* (2013.01)

(58) Field of Classification Search
CPC .................. G05B 19/041; G05B 15/02; B01F 2003/04872; B01F 3/04836; A01M 21/043; A01M 7/0092; A01M 7/0085; A01K 63/047; A01C 23/042; A01C 23/007; C02F 1/008; C02F 1/24; C02F 1/50; C02F 1/68; C02F 1/685; C02F 1/72; C02F 1/74; C02F 1/78; C02F 1/686; C02F 7/00; C02F 2103/007

See application file for complete search history.

(56) References Cited

U.S. PATENT DOCUMENTS

| | | | | |
|---|---|---|---|---|
| 3,920,552 A | * | 11/1975 | Elkern | C02F 7/00 210/141 |
| 4,818,416 A | * | 4/1989 | Eberhardt | C02F 1/66 210/198.1 |
| 5,227,067 A | * | 7/1993 | Runyon | B01F 3/0473 210/143 |

(Continued)

*Primary Examiner* — Lucas A Stelling
(74) *Attorney, Agent, or Firm* — Leavitt Eldredge Law Firm

(57) ABSTRACT

A system for dispersing a chemical in a surface water body includes an aerator device, having an injector positioned at a bottom of the surface water body; and a holding tank to store the chemical adjacent to the surface water body; and a metering pump connected to the holding tank, the metering pump having a computing device to program the metering pump; the metering pump is programed to inject an amount of the chemical to the injector at a rate; and the injector disperses the chemical throughout the surface water body.

7 Claims, 3 Drawing Sheets

(56) References Cited

U.S. PATENT DOCUMENTS

2004/0154990 A1\* 8/2004 DeBusk ................... C02F 1/52
　　　　　　　　　　　　　　　　　　　　　　210/739
2013/0015137 A1\* 1/2013 Urmenyi ................ B01D 37/04
　　　　　　　　　　　　　　　　　　　　　　210/654

\* cited by examiner

SURFACE WATER CHEMICAL INJECTION SYSTEM AND METHOD OF USE

BACKGROUND

1. Field of the Invention

The present invention relates generally to chemical application systems, and more specifically, to a surface water chemical injection system for use in treating unwanted aquatic vegetation and/or augmenting water quality.

2. Description of Related Art

Chemical application systems are well known in the art and are effective means to distribute chemicals to an area using a secondary transport method. For example, FIG. 1 depicts a conventional chemical application system 101 having a boat 103 configured to transport a chemical 105 on a water body 106. During use, chemical 105 is dispersed by a technician 107 on board boat 103.

In FIG. 2, a flowchart 201 depicts the method of system 101. A body of water is treated with a chemical by transporting the chemical to the water body and manually applying the chemical from boat 103 to treat the water, as shown with boxes 203, 205, 207.

One of the problems commonly associated with system 101 is inefficiency. For example, chemicals are commonly spilled into the body or water, or alternatively, the technician may make a mistake in calculations, thereby causing the wrong amount of a chemical to be dispersed into the water body.

Accordingly, although great strides have been made in the area of chemical application systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
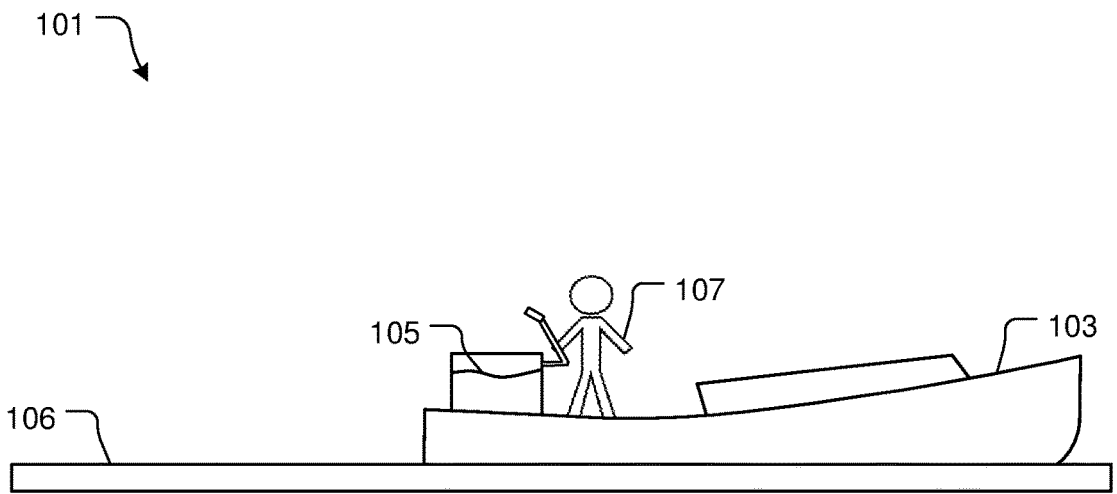
FIG. 1 is a simplified schematic of a common chemical application system.
Figure 2:
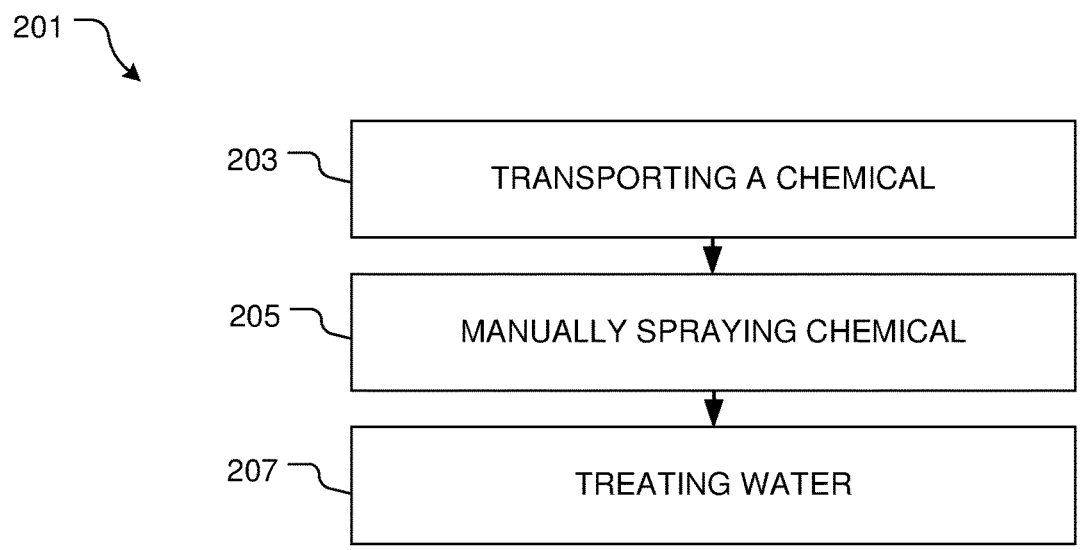
FIG. 2 is a flowchart of the method of FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional chemical application systems. Specifically, the present invention provides a means to chemically treat a surface water body using a metered, precision distribution device. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 3:
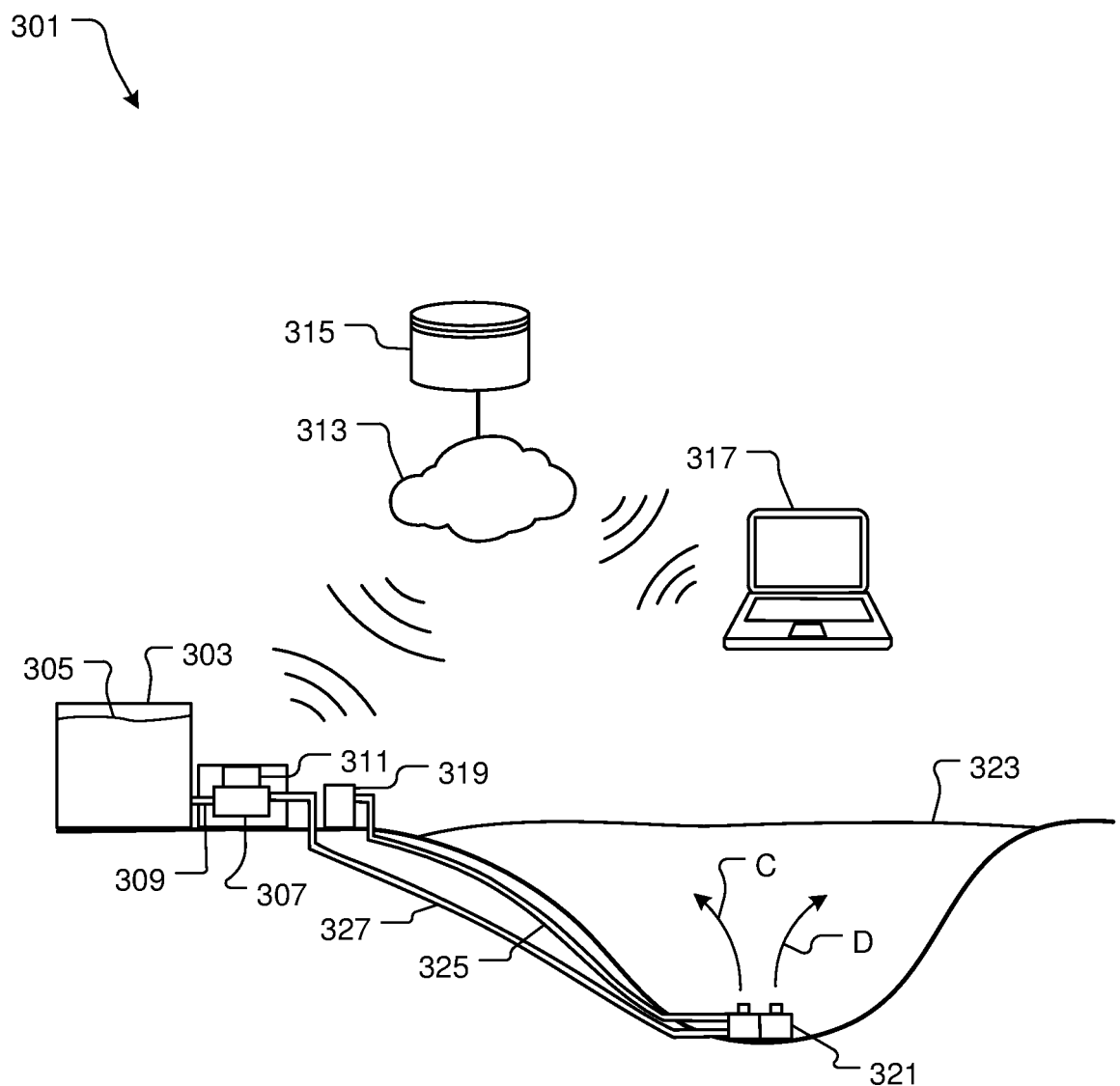
FIG. 3 is a simplified schematic of a surface water chemical injection system in accordance with a preferred embodiment of the present application.

Referring now to the drawings wherein like reference characters identify corresponding or similar elements throughout the several views, FIG. 3 depicts a simplified schematic of a surface water chemical injection system 301 in accordance with a preferred embodiment of the present application. It will be appreciated that system 301 overcomes one or more of the above-listed problems commonly associated with conventional chemical application systems.

In the contemplated embodiment, system 301 includes a holding tank 303 configured to hold a chemical 305. It should be appreciated that chemical 305 can be a fertilizer, an herbicide, a nutrient abatement, a polymer solution, or a variety of other chemicals used in surface water management. In the preferred embodiment, a metering pump 307 is connected to holding tank 303 by any appropriate means such as a pipe 309. Metering pump 307 includes a computing device 311 configured to program pump 307. Such programing can include a rate and an amount of chemical 305 to be pumped from holding tank 303. It is contemplated that computing device 311 can be manually programed, or alternatively, system 301 can include a wireless network 313 with a server 315 and in communication with a second computing device 317, thereby providing a means to program pump 307 wirelessly from a remote location.

In the preferred embodiment, system 301 further includes an aerating device 319 connected to one or more injectors 321 positioned at or near the bottom of surface water body 323. Aerating device 319 is configured to pump air through injector 321 via pipe 325, as indicated with arrows C and D. Similarly, metering pump 307 is configured to pump chemical 305 to injector 321 via a pipe 327.

It should be appreciated that one of the unique features believed characteristic of the present application is the use of metering pump 307 to pump a chemical to an injector connected to an aerating device. It should be appreciated that this combination, when used with a surface water body, provides a means to evenly disperse the chemical throughout the surface water body. The water can then be safely treated with pesticides, herbicides, or other chemicals in a measured dosage. This feature allows for the safe and metered treatment of a surface body of water, thereby saving time and resources.

Figure 4:
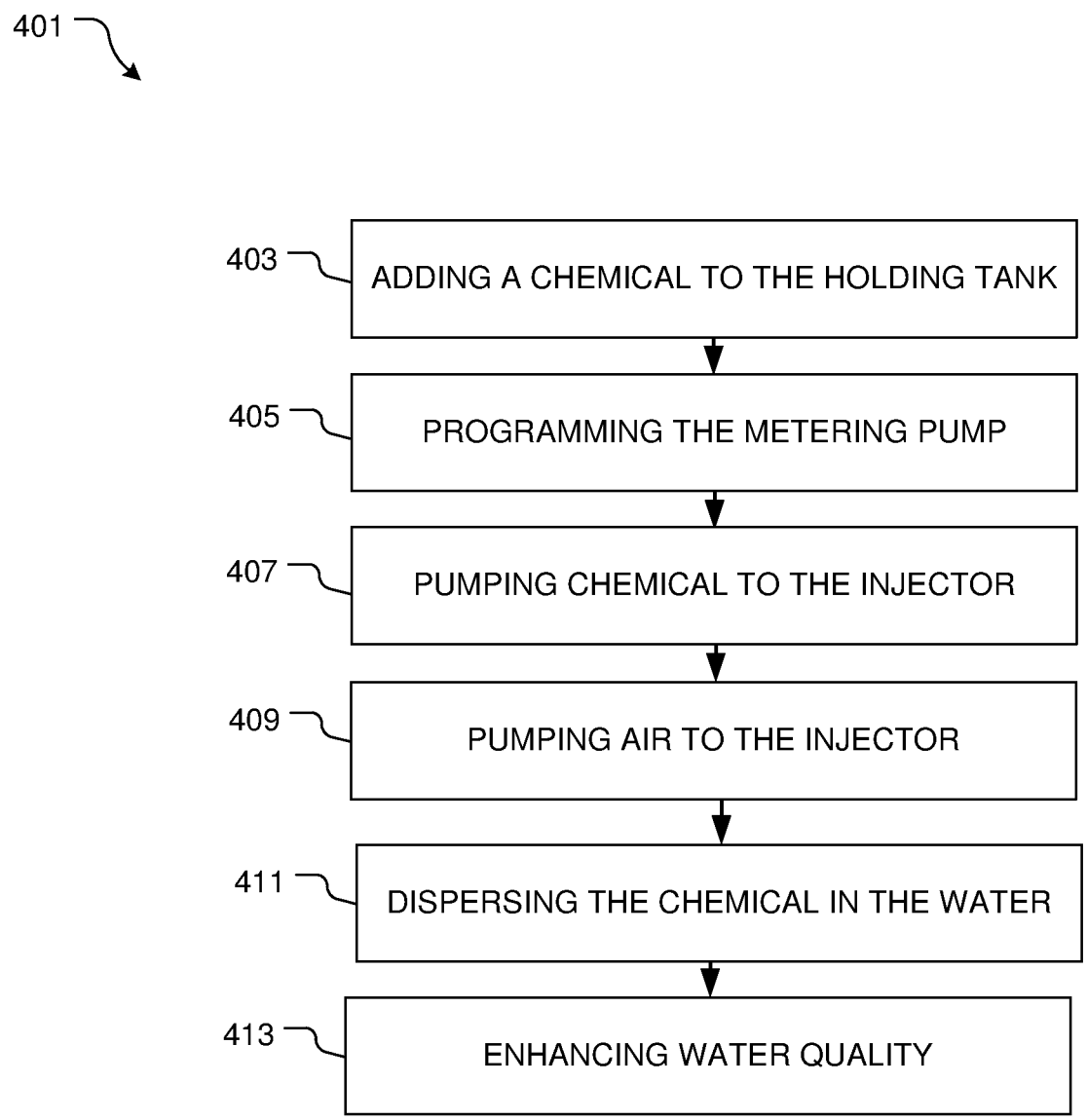
FIG. 4 is a flowchart of the method of FIG. 3.

In FIG. 4, a flowchart 401 depicts the method of system 301. A chemical is added to the holding tank, where the chemical will remain stored until used, as shown with box 405. The metering pump is programed via the computing device, as shown with box 405. It should be understood that the metering pump can be manually programed or can be wirelessly programed via the wireless network and the second computing device. The chemical is pumped to the injector based on the programed metering pump, as shown with box 407. Simultaneously, air is pumped to the injector via the aerating device, thereby causing a dispersement of the chemical into the water, as shown with boxes 409, 411. The quality of the water body is then enhanced by thoroughly and evenly treated with the appropriate chemical thereby saving time and resources, as shown with box 413.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system for dispersing a chemical in a water body contained in a reservoir having a bottom surface, the system comprising:
   an aerator device, having:
      an injector positioned at the bottom of the water body;
      a holding tank configured to store the chemical adjacent to the water body;
      a metering pump in fluid communication with the holding tank;
      a first computing device operably associated with the metering pump and wirelessly connected to a remote second computing device, the second computing device is configured to communicate with the first computing device to regulate the amount of the chemical passing through the metering pump;
      a first pipe extending from the metering pump to the injector, wherein the chemical flows from the holding tank to the injector via the pipe and via the metering pump;
      a second pipe in gaseous communication with the injector, the second pipe is configured to direct a gas to the injector; and
   wherein the injector disperses the chemical throughout the water body, while simultaneously injecting air into the water body.

2. The system of claim 1, wherein the chemical is a fertilizer.

3. The system of claim 1, wherein the chemical is an herbicide.

4. The system of claim 1, wherein the chemical is a polymer solution.

5. A method of dispersing a chemical within a surface water body, the method comprising:
   providing the system of claim 1;
   adding an amount of chemical to the holding tank;
   programming the metering pump via the computing devices;
   pumping the chemical to the injector via the metering pump; and
   pumping air through the injector via the aerator device, wherein both air and the chemical are simultaneously injected from the bottom of the water by via the injector;
   wherein the metering pump is programmed to pump a specified amount at a specified rate via the computing devices: and
   wherein the chemical is dispersed through the surface water body via the injector.

6. The method of claim 5, wherein the chemical is a fertilizer.

7. The method of claim 5, wherein the chemical is an herbicide.

* * * * *